Jan. 24, 1933. R. RICHTER 1,895,007
ALTERNATING CURRENT MOTOR
Filed Nov. 8, 1928 2 Sheets-Sheet 1
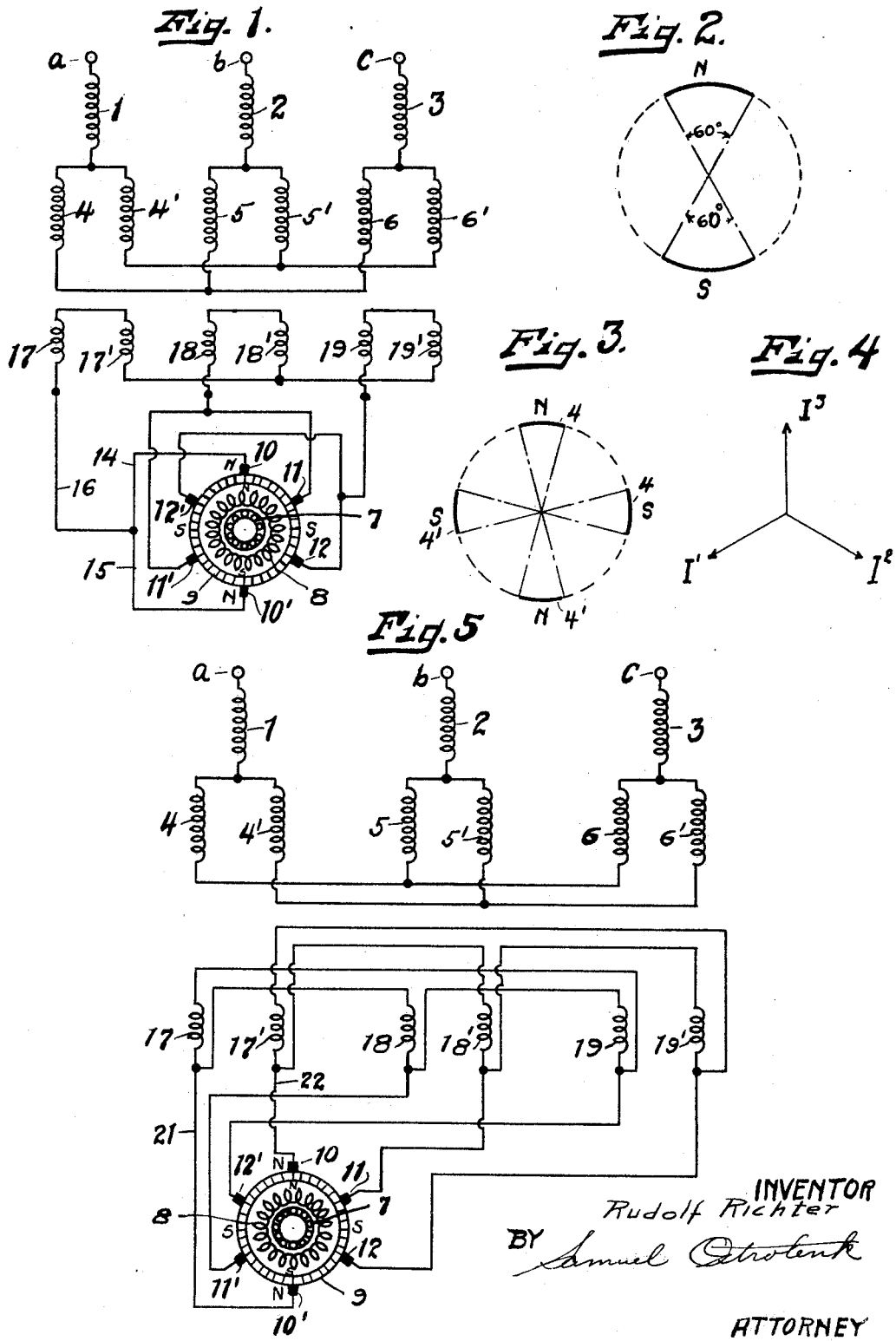

Jan. 24, 1933.  R. RICHTER  1,895,007
ALTERNATING CURRENT MOTOR
Filed Nov. 8, 1928   2 Sheets-Sheet 2

INVENTOR
Rudolf Richter
BY Samuel Ostrolenk
ATTORNEY

Patented Jan. 24, 1933

1,895,007

UNITED STATES PATENT OFFICE

RUDOLF RICHTER, OF DURLACH, GERMANY, ASSIGNOR TO RADIO PATENTS CORPORATION, OF NEW YORK, N. Y., A CORPORATION OF NEW YORK

ALTERNATING CURRENT MOTOR

Application filed November 8, 1928, Serial No. 317,974, and in Germany November 23, 1927.

My invention relates to alternating current motors and more particularly to induction motors provided with compensating windings.

It is well known that the current supplied from an alternating current line to an induction machine differs in phase from the impressed voltage because of the fact that this current is required to establish the magnetic field of the machine. Thus in the case of an induction motor, the primary current normally lags somewhat behind the impressed voltage. This phase difference is not constant but decreases as the load of the motor is increased from zero to its full value. In order to improve the power factor at all loads, it has been found necessary to supply the magnetizing current independently of the primary circuit. This has been accomplished by a compensating winding which is placed in slots adjacent the motor secondary winding.

These compensating windings are connected to the magnetizing windings through a segmented commutator to brushes as in a direct current machine. Due to the large slip, especially during starting, that is, the ratio of the velocity of the rotating field produced by the stator as compared to the speed of rotation of the rotor, large voltages are generated in the compensating turns producing excessive arcing at the brushes as they short circuit the turns of the compensating winding.

This sparking is particularly severe in a type of motor which uses for starting purposes a different number of poles from the working number of poles. A full discussion of such a motor and the problems connected therewith is given in the Electrotechnische Zeitschrift of 1925, page 6 and of 1926, page 966.

The sparking is further augmented in large motors where a number of brushes in parallel are required, by the fact that circulating currents arise between these parallel brushes. The object of this invention is to minimize, as far as possible, the sparking due to such circulating currents.

It has been the practice heretofore to connect all of the brushes on the commutator of the same polarity and phase in multiple. During working conditions, these brushes which I shall call equal-phase brushes are always at the same potential so that there is little or no current flow between them. When however the number of poles is other than that normally obtained during working, as is true during starting in the motor arrangement described in the above, the equal-phase brushes are no longer associated with the same polarity and a potential difference exists between them resulting in a cross or equalizing current flow between the brushes again producing arcing and the accompanying destruction of the brushes and segments.

Accordingly my invention has for one of its objects the provision of simple and reliable means for reducing to a minimum the arcing produced at the commutator brushes.

A further object of my invention is to provide means in an alternating current motor employing a different number of starting and working poles for preventing arcing at the brushes.

Another object of my invention is to provide circuit connections in alternating current motors, such that there is no direct connection between the equal-phase brushes.

Still another object of my invention is to electrically insulate equal-phase brushes from each other.

There are other objects of my invention which together with the foregoing will appear in the detailed description of the specification which follows in which, Figure 1 is a diagrammatic view of the electrical circuits of a three phase induction motor provided with a starting and working stator and a compensating commutator winding in which the equal phase brushes are electrically interconnected.

Figure 2 is an electrical diagram showing the angular spacing of the starting poles in Figure 1.

Figure 3 is a diagram of the angular spacing of the working poles.

Figure 4 is a vector diagram of the current distributions through the compensating winding shown in Figure 1.

Figure 5 is a diagram of a three phase induction motor showing one embodiment of my invention in which the commutating windings are so connected as to prevent equalizing or cross current.

Figure 6:
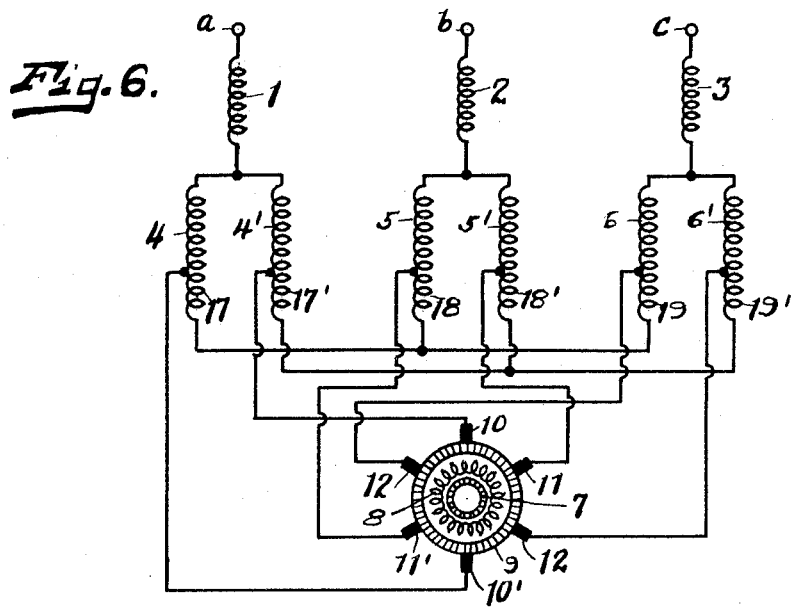
Figure 6 is a diagram of a modification of the arrangement shown in Figure 5 in which part of the working winding is employed as the exciting field.
Figure 7:
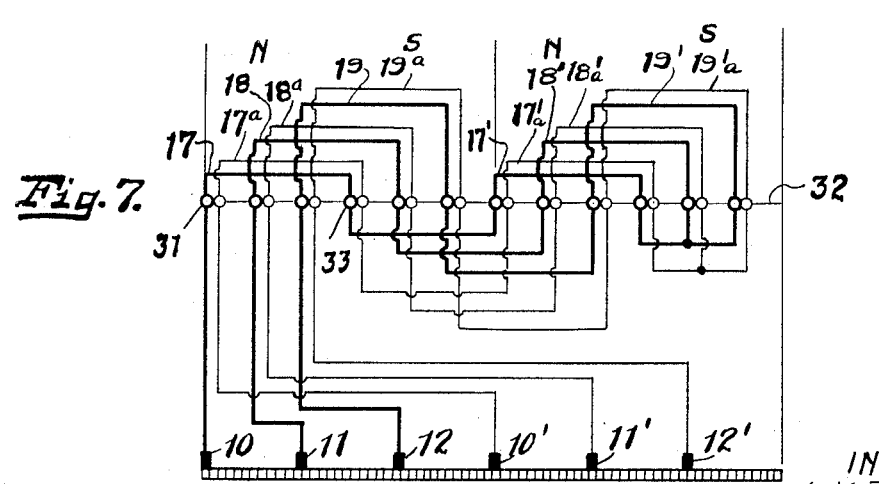
Figure 7 is a diagrammatic view of an improved arrangement in which the compensating winding for all four poles are associated with one set of brushes and an entirely separate exciting winding is associated with a second set of brushes.

In Figure 1 the induction motor shown is provided with polyphase primary windings 1, 2 and 3 connected to a power system (not shown) in a star or Y connection, although it will be understood that any other connection may be employed if desired. As shown in Figure 2, each of these phase windings comprises two poles, each occupying an angular space of 60° and oppositely disposed on the motor and of opposite polarities as is well known to those skilled in the art. These windings 1, 2 and 3 which comprise the starting windings as will be described more fully hereinafter are connected in series with two multiple windings 4, 4'; 5, 5' and 6, 6' respectively comprising the working windings. As shown in Figure 3, each of these windings comprises two poles each pole occupying a space of 30°. Thus for example the two poles of winding 4 are illustrated as occupying the upper and righthand sectors, the polarity of one being north and the other south. Similarly the two poles of winding 4' occupies the lower and left sector and are of opposite polarity. Similar relations exist with respect to the poles of each of the other phases 5, 5' and 6, 6'.

As is clear from the above the working windings of each phase such as 4, 4' have twice the number of poles as the same phase starting winding. It will be understood however that this ratio is here employed in order to illustrate the invention and that in practice any desired ratio between starting and working windings may be employed. Although the working windings such as 4, 4' are shown connected in multiple, it will be understood that a series connection or any other desired circuit arrangement may be employed.

As described in the publication referred to above the impedance of the working windings is such compared to the impedance of the starting winding during starting that comparatively all of the torque is produced by the latter whereas at full speed no torque is produced by the starting winding which may thereupon be short circuited while the working windings become effective in producing the necessary torque.

In inductive relation with all these pole windings is a rotor provided with a secondary winding 7 and a commutator compensating winding 8. Successive turns of the compensating winding 8 are connected to adjacent segments on the commutator 9. This compensating winding 8 of the usual direct current motor construction is wound for the same number of poles as the working windings 4, 4'; 5, 5' and 6, 6'; that is in the present case for four poles.

Wiping over the segments of the commutator 9 are brushes 10, 11, 12, 10', 11' and 12' each set of diametrically opposite brushes being connected to the two poles of the same phase.

Heretofore the equal-phase brushes such as 10 and 10'; that is the brushes connected to the same poles in a phase have been electrically interconnected as shown by the conductors 14 and 15 and thence connected over a conductor such as 16 to the magnetizing windings 17 and 17' of the same phase. These magnetizing windings 17, 17'; 18, 18' and 19, 19' are positioned on the stator and are provided with the same number of poles as the working windings 4, 4' 5, 5' and 6, 6' have. As is clear from the drawings these magnetizing windings are connected in Y although any other arrangement may, if desired, be employed. The currents flowing through these windings produce the necessary magnetizing current and accordingly bring the power factor of the induction motor substantially to unity in a manner well known to those skilled in the art.

In order to illustrate the cause of the cross currents referred to hereinbefore, I have designated the polarities existing at the field poles at any instant during working operations on the outside circumference of the commutator 9, the north pole being designated by the letter N and the south pole by the letter S as is usual in the art. For the particular instant chosen the polarity at brush 10 is north due to one of the field windings 4'. The same polarity now exists at the diametrically opposite brush 10', due to the second winding 4. As shown is Figure 3 these windings also produce south poles 90° displaced from the north poles. It will be understood that the polarities are chosen for only one of the phases, each of the other phases producing equivalently positioned polarities. As stated this condition represents the normal working condition and as will be clear from an inspection of the drawings the potentials at the brushes 10 and 10' are substantially the same producing little or no cross or equalizing current therebetween. In practice, however, there may be a displacement of the relative position of one of these brushes with respect to the other and in relation to the poles, producing a potential difference causing a cross current. In addition there may be an induced current from the turns in the slots. These currents produce arcing at the brushes.

The effective compensating currents flowing over the brushes 10 and 10' are carried by conductors 14, 15 and 16 to windings 17 and 17'. These currents are then divided, one half flowing through windings 18, 18' to brushes 11, 11' and through the compensating winding to brushes 10 and 10' and the other half through windings 19 and 19' to brushes 12 and 12' and through the compensating winding to brushes 10 and 10'.

In starting, however, an entirely different condition exists, due to the fact that the number of starting poles is different from the number of working poles, and excessive cross or equalizing currents are produced.

It has been assumed for the purpose of illustrations that half the number of working poles are employed for starting. As stated in the foregoing description, these are produced by the starting windings 1, 2 and 3 which are relatively positioned as shown in Figure 2. In Figure 1, the letters N and S on the inner circumference of the commutator 9 represent north and south poles respectively of the phase winding 1, similar polarities existing for each of the other phase windings. With this condition, the brush 10 is under a north pole at the same instant that the brush 10' is under a south pole. Accordingly a large potential difference exists between these two brushes equal to the voltage generated between any two poles. This condition in fact is almost the equivalent of a direct short circuit between the brushes 10 and 10' producing a cross or equalizing current flow between the brushes. This current while performing no useful purpose causes arcing and deterioration of the brushes and the segment on the commutator.

In order to eliminate this defect I have provided the circuit arrangement from the brushes of the commutator shown in Figure 5. In this figure, I have employed the same reference numerals for like parts, particularly such as the starting and working windings of the stator which are duplicates of that used in Figure 1, the same windings and connections being here employed. The exciting windings 17, 17', 18, 18' and 19, 19' are the same as shown in Figure 1 and are provided with the same number of poles except that in this instance those of the same phase are not electrically interconnected as in Figure 1. It will be noted that the windings 17, 18 and 19 are connected in a delta connection and windings 17', 18' and 19' are connected in a separate delta electrically insulated from the first delta connection. The winding 17 is connected over the conductor 21 to the brush 10', while the winding 17' is connected to the equal phase brush 10 over the conductor 22. In a similar manner the winding 18 of another phase in the first delta is connected to the brush 11' while the winding 18' of the other delta is connected to the diametrically opposite equal phase brush 11, and the winding 19 of one delta is connected to the brush 12' while the winding 19' is connected to the equal phase diametrically opposite brush 12.

The polarity condition for starting and working operations are the same as in Figure 1 and are illustrated by letters N and S on the outer circumference of the commutator for the working condition and on the inner circumference of the commutator for starting conditions.

During working, the same conditions exist as in Figure 1 except that the possibility of cross currents between the brushes 10 and 10' due to any defects or induced currents is eliminated. The circuit for the compensating winding now extends from the brush 10' over the conductor 21 through the winding 17 returning over the brush 12'. Multiple circuits include winding 19 and brush 11' and winding 18 and brush 11'. At this time the current from the brush 10 flows through the winding 17' of the second delta returning over the brush 12. Equivalent multiple circuits pointed out above are completed.

The current flowing through the windings 17 and 17' are accordingly substantially similar to that obtained in the case of Figure 1. In the case of Figure 5, however, there can be no cross currents flowing from the brush 10 to the brush 10', inasmuch as the circuits extending from these brushes are electrically separated from each other.

The advantages of this circuit condition is however emphasized during starting operations. At that time for the particular instant chosen for illustration, the polarity under the brush 10 is a notch pole while the polarity under the brush 10' is a south pole. The currents flowing in these two brushes, however, do not extend to each other and therefore do not produce an excessive flow between the brushes, these currents separately flowing through the windings 17 and 17'. It will be clear then from the above description that by the provision of circuit arrangements which electrically separate the equal phase brushes it is possible to use a different number of working and starting poles without producing any equalizing current flowing between these brushes and the compensating winding which would injure the apparatus. In the illustration chosen two equal phase brushes are electrically separated. It will be understood that the same principle applies for any number of brushes, this number depending on the number of poles in a phase during working operation.

In Figure 6, I have illustrated a modified form of my invention. It will be recalled that in Figure 5 the exciting windings are shown as separated from and independent of the stator windings. In Figure 6 the lower half of the working winding is employed as the exciting winding through which the exciting current from the brushes associated with the compensating windings flows. In this figure I have employed the same characters used in Figure 1 for designating similar parts. Thus the stator field starting and working windings and the commutator brushes are designated by the same characters these being the same as in Figure 1. The lower portion of the working windings 4, 4'; 5, 5' and 6, 6' are employed for the exciting windings 17, 17'; 18, 18' and 19, 19'. The compensating and rotor windings are the same as those in Figure 1. In this modification the working windings 4 to 6' have twice as many poles as the starting windings 1 to 3 with which they are connected in series in a three phase Y or star connection. The exciting windings 17 to 19' constitute part of the star connections, windings 17, 18 and 19 being in one star and 17', 18' and 19' in the second star.

The circuit from any brush such as 10' includes two phases in one star connection such as the exciting windings 17 and 18 to brush 11' or exciting windings 17 and 19 to brush 12 the current distributions being that shown in Figure 4. In this case the brushes 10 and 10' are not electrically insulated from each other although substantially the same effect is produced as any circuit from brush 10 to 10' includes the exciting windings 17 and 17' and in addition either exciting winding 18 and the windings 5 and 5' or exciting winding 19'. The impedance of all these series windings amounts substantially for all practical purposes to an open circuit between these brushes. Inasmuch as the circuits are otherwise the same as in Figure 5, the operation whereby equalizing currents between equal phase brushes is prevented will now be clear.

In Figure 8, I have shown the actual disposition of the equalizing windings 17 to 19' on the stator the commutator being shown developed. The circles 31 on the central line 32 represent the conductors or group of conductors for each pole on the stator, comprising the exciting windings 17 to 19'. Thus the winding 17 provides one pole at 31 of one polarity and a second pole of opposite polarity at 33. This, it will be noted, is in conformity with the pole distribution of the working windings diagrammatically illustrated in Figure 1. The compensating windings associated with brushes 10 to 12 lie opposite one pair of poles.

In this embodiment of my invention two independent sections of exciting windings of the poles of the same phase in each set are connected together.

Each of the circles represents a pole winding illustrating their distribution over the entire circumference. The two poles of windings 17 and 17' are here shown connected in series and to the brush 10. However the brush 10' is connected to a separate section of exciting poles 17$^a$ and 17'$^a$ electrically insulated from the first section of exciting poles. Current flowing from brush 10 can pass through the exciting poles of only one of these systems returning over the brushes 11 and 12. At no time, is there a circuit from brush 10 to brush 10'. The values of the compensating current as in the other modifications are substantially the same as that obtained in the arrangement heretofore in use in which the equal phase brushes were electrically connected to each other.

The compensating winding lies however in exactly the same relative position to these separate sections of poles connected thereto by separate sets of brushes. In order to obtain the two sections of exciting windings two windings are arranged in each slot on the stator and are connected in series as shown in Figure 8. Although but two parallel windings are shown, it is understood that in case of a greater number of poles a corresponding number of parallel windings are placed in each stator slot.

While the invention has been illustrated as applied to the circuit connections from the compensating windings to the stator windings of a machine described as an induction motor, it may obviously be applied to other types of machines. Other modifications will readily occur to those skilled in the art. I accordingly do not wish to be restricted to the particular forms of construction disclosed herein by way of example for the purpose of setting forth my invention in accordance with the patent statutes. The terms of the claims are therefore not intended to be restricted to the precise structure that is disclosed but are intended to cover all changes and modifications within the spirit in scope of my invention.

What I claim as new and desire to secure by Letters Patent of the United States is:—

1. In an alternating current, multiphase, multipolar motor, a primary winding, a secondary winding movable with respect to said primary winding, a further primary winding forming an exciting winding, said exciting winding comprising a plurality of equal phase sections, one for each pair of poles of said motor, a secondary compensating winding, a commutator connected to said compensating winding, a plurality of brushes wiping over said commutator and connections from said brushes to equal phase sections of said exciting winding, the equal phase brush terminals being separated by at least one of said sections.

2. In an alternating current, multipolar, multi-phase motor, a primary starting winding having a predetermined number of poles, a primary working winding having a different number of poles, a further primary winding having a number of poles equal to said working winding forming an exciting winding, said exciting winding having a plurality of equal phase sections, one for each pair of poles of said working winding, a secondary compensating winding for said motor, a commutator connected to said compensating winding, a plurality of brushes wiping over said commutator and connections from said brushes to said exciting winding, the equal phase brush terminals being separated by at least one of said equal phase sections.

3. In an alternating current multipolar, multiphase, asynchronous motor having a stator and a rotor, a primary working winding on said stator, a short-circuited winding on said rotor, an exciting winding on said stator, said exciting winding comprising a plurality of equal phase sections corresponding in number to the number of pairs of poles of said working winding, a compensating winding carried by said rotor, a commutator connected to said compensating winding and a plurality of brushes wiping over said commutator, connections from said brushes to said exciting winding, equal phase brush terminals being separated by at least one of said sections of said exciting winding.

4. In an alternating current, multipolar, multiphase, asynchronous motor having a stator and a rotor, a primary starting winding on said stator having a predetermined number of poles, a primary working winding having a different number of poles, a short circuited rotor winding, a portion of said primary working winding comprising an exciting winding for said motor, said exciting winding comprising a plurality of equal phase sections corresponding to number of pole pairs of said working winding, a compensating winding carried by said rotor, a commutator connected to said compensating winding, a plurality of sets of brushes wiping over said commutator, the number of sets of brushes being equal to the number of sets of sections in said exciting winding and connections from said brushes to said exciting winding, equal phase brush terminals being separated by at least one of said equal phase sections of said exciting winding.

5. In combination in a multi-phase alternating current machine, a commutator, a starting winding having a predetermined number of poles, a working winding having a different number of poles, exciting winding, a compensating winding having brushes for conducting the current from the compensating winding to said exciting winding, said exciting winding comprising a plurality of equal phase sections one for each pair of poles of said motor, and connections from said brushes to said equal phase sections of said exciting winding, the equal phase brush terminals being separated by at least one of said sections.

In testimony whereof I affix my signature.
RUDOLF RICHTER.